(12) United States Patent
Rovik et al.

(10) Patent No.: US 7,889,063 B2
(45) Date of Patent: Feb. 15, 2011

(54) CUSTOMIZABLE VEHICLE INFORMATION DISPLAY

(75) Inventors: Christopher L. Rovik, Canton, MI (US); Fred W. Lupton, III, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 290 days.

(21) Appl. No.: 11/971,226

(22) Filed: Jan. 9, 2008

(65) Prior Publication Data

US 2009/0174537 A1 Jul. 9, 2009

(51) Int. Cl.
*B60Q 1/00* (2006.01)

(52) U.S. Cl. .................. 340/438; 340/525; 340/539.24; 340/815.4; 345/204

(58) Field of Classification Search .................. 340/438, 340/439, 525, 815.4, 539.24; 362/23, 26, 362/800; 345/204, 472; 701/29, 33
See application file for complete search history.

(56) References Cited

U.S. PATENT DOCUMENTS

| | | | |
|---|---|---|---|
| 5,088,673 A | 2/1992 | Chandler | |
| 6,359,554 B1 | 3/2002 | Skibinski et al. | |
| 6,452,597 B1 * | 9/2002 | Goldberg et al. | 345/472 |
| 6,696,932 B2 | 2/2004 | Skibinski et al. | |
| 6,842,677 B2 | 1/2005 | Pathare | |
| 7,089,086 B2 | 8/2006 | Schoonover | |
| 7,170,400 B2 * | 1/2007 | Cowelchuk et al. | 340/438 |
| 7,251,552 B2 * | 7/2007 | Schmeisser et al. | 701/29 |
| 7,272,497 B2 | 9/2007 | Koshiji et al. | |
| 7,379,801 B2 * | 5/2008 | Heffington | 701/33 |
| 7,489,238 B2 * | 2/2009 | Cieler et al. | 340/525 |
| 7,609,152 B2 * | 10/2009 | Crowe et al. | 340/461 |
| 7,626,491 B2 * | 12/2009 | Yamada et al. | 340/438 |
| 2006/0085748 A1 * | 4/2006 | Luther et al. | 715/700 |

* cited by examiner

*Primary Examiner*—Davetta W Goins
(74) *Attorney, Agent, or Firm*—Gifford, Krass, Sprinkle, Anderson & Citkowski, P.C.

(57) ABSTRACT

A system and method for creating a customizable video display in a vehicle is provided for allowing a user to select what driving information is to be displayed. The system having a video display device fixed on the instrument panel of a vehicle, and an input device allowing users to choose what to view and the size the information will appear in, from a list of vehicle driver information. The method having the steps of providing a list of driver information from which the user may select, selecting the desired driver information to be displayed, selecting the size the information will be displayed in, and displaying the information on the video display device.

5 Claims, 3 Drawing Sheets

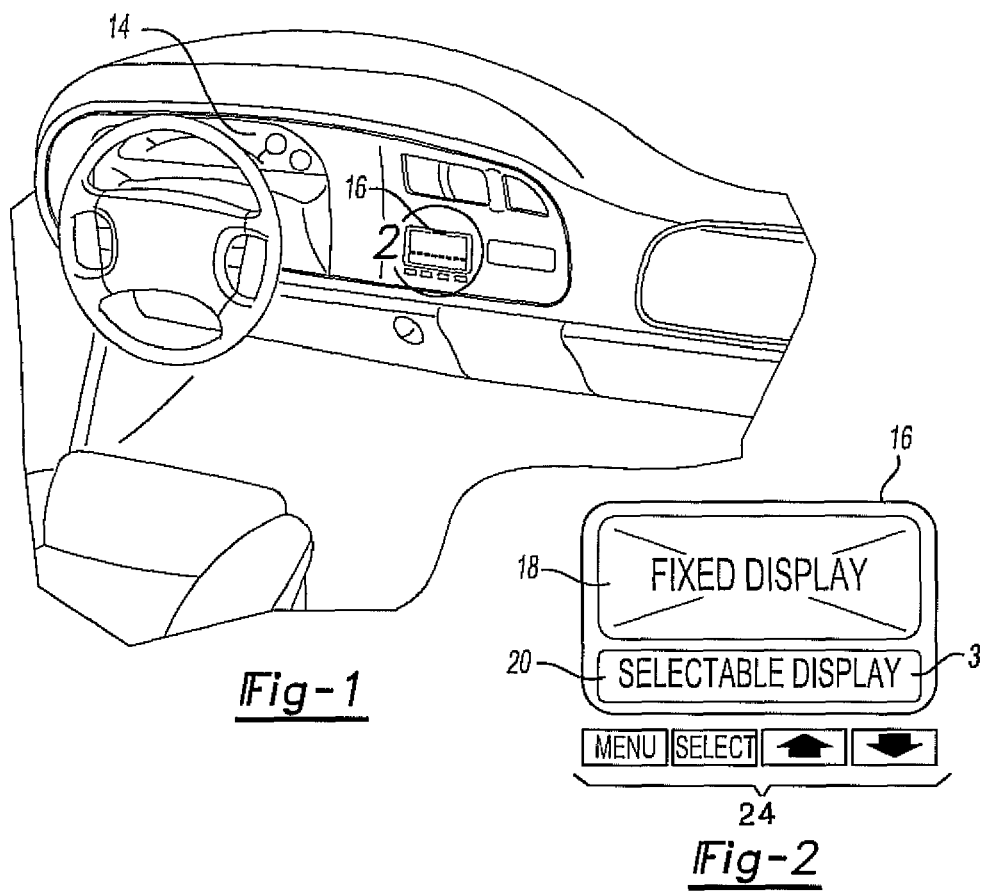
Fig-1
Fig-2
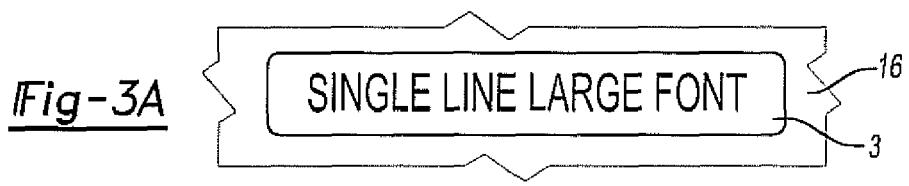
Fig-3A
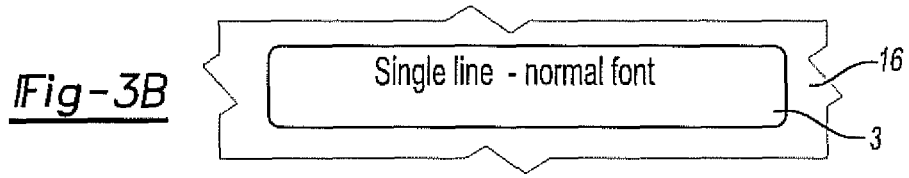
Fig-3B
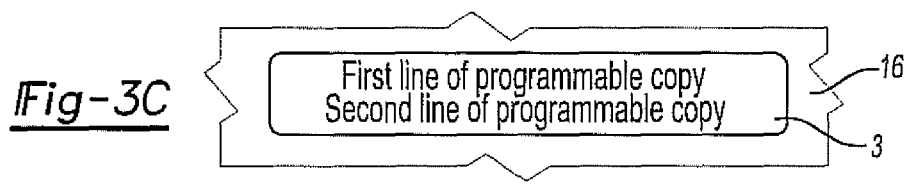
Fig-3C
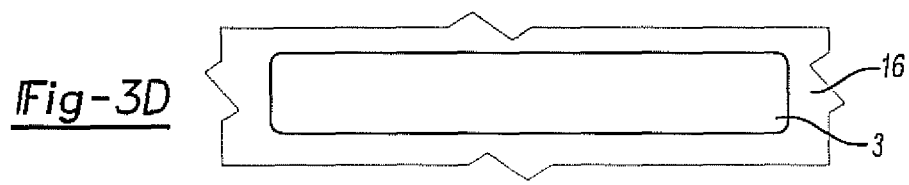
Fig-3D

CUSTOMIZABLE VEHICLE INFORMATION DISPLAY

BACKGROUND OF THE INVENTION

1. Field of the Invention

The invention relates to a system and method for providing a customizable display of vehicle and driver information to an operator of a vehicle. In particular the invention provides for a vehicle display and an input device allowing a user to select the number and type of driver information to be displayed.

2. Description of the Prior Art

Video display devices, such as a video screen are useful for providing drivers and passengers with information relating to vehicle operation such as distance to empty, average fuel economy, and the like. Video display devices are designed to provide visual information while at the same time maintaining the driver's visibility. Video display devices are also designed in consideration of the limitations of the interior space of a vehicle. Accordingly, many displays are boxed shaped and have a relatively small size to fit automotive applications. The relatively small design leaves automotive suppliers with limited space on the display screen to display information. This in turn limits the amount of information that can be displayed. Too much information may clutter the small display area and make the information presented to the user difficult to view. Furthermore, users have different preferences as to what they want to view and these preferences may change depending upon the driving conditions. For example a user being conscience of gas prices and fuel efficiency may want to monitor the average fuel consumption one day, or want to know what the distance to empty is on another. As a result there is a need for a vehicle system displaying information that can be customizable to user needs such that the video display device does not present information which is of no interest to the user.

SUMMARY OF THE INVENTION AND ADVANTAGES

According to one aspect of the invention, a system and method for creating a customizable display of a vehicle is provided for allowing a user to select what driving information is to be displayed, and the size the information is displayed in. The system has a video display device fixed on the instrument panel of a vehicle, and an input device allowing a user to select from a list of information desired to be displayed. Sensors located throughout the vehicle gathers and monitors vehicle data, and a processor processes the information to provide information in other forms such as distance to empty, average fuel economy, current fuel economy, average speed and the like. The processor presents the data to the driver via a menu presented on the video display device. The user may simply select the data desired to be displayed via an input device, and the video display device will display them.

A method for creating a customizable display for displaying vehicle information selected by a user is also provided. The method having the steps of providing a list of driver information from which the user may select, selecting the desired driver information to be displayed, and displaying the information on a video display device.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective view of a vehicle instrument panel showing an instrument cluster and a customizable video display system;

FIG. 2 is a front view of the customizable video display system and an input device disposed beneath the video display system, the video display device is shown having a fixed display portion and a selectable display portion, the selectable display portion presenting up to two lines of information;

FIG. 3A is a front view of the selectable display portion in a display configuration where the user chooses to display one line of information in a large font setting;

FIG. 3B is a front view of the selectable display portion in a display configuration where the user chooses to display one line of information in a smaller default font setting;

FIG. 3C is a front view of the selectable display portion in a display configuration where the user chooses to display two lines of information, one line of information is placed above the other and both lines are presented in the default font;

FIG. 3D is a front view of the selectable display portion in a display configuration where the user chooses not to display any vehicle information;

DETAILED DESCRIPTION OF THE INVENTION

Figure 4:
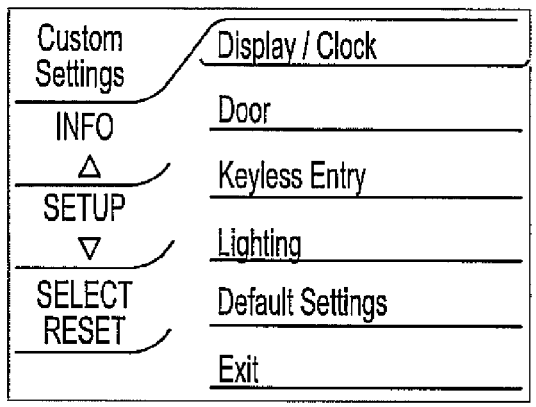
FIG. 4 is a front view of the video display device presenting a menu.

Referring to the Figures, wherein like numerals indicate corresponding parts throughout the several views, a system and method for providing a customizable display of vehicle and driver information to an operator of a vehicle having a plurality of sensors 10 (not shown) monitoring and collecting various signals regarding vehicle functions is provided. The system utilizes vehicle information gathered and processed by processors 12. FIG. 1 shows an instrument cluster 14 of a vehicle which serves as a processor 12. Currently known sensors 10 such as fuel tank level sensors 10, a gear train for measuring the rotation of the wheel, or a speedometer can be utilized in the system to supply data to the instrument cluster 14. However, it is anticipated that any processor 12 or sensor 10 may be utilized in the system. The instrument cluster 14 receives, processes, and returns the data to a user in a textual form showing categories of information such as average fuel economy, current fuel economy, trip time, average speed, and distance to empty. The processor 12 may process other vehicle data to provide more categories of information that may be of interest to the user such as the current time, outside temperature, HVAC status, or a view from the rear of the vehicle. The processor 12 may further designate the categories of information as being fixed information or selectable information.

FIGS. 1 and 2 show an embodiment of the video display device 16 being a video screen mounted on the instrument panel of the vehicle. The video screen being preferable in this embodiment as it allows the user to see a video camera view from the rear of the vehicle; however it is anticipated that other forms of display may be utilized. The video display device 16 may switch between the camera view and a display presenting categories of vehicle information.

FIG. 2 shows an embodiment of the video display device 16 presenting a fixed display portion 18 and a selectable display portion 20. Each category of vehicle information is further designated by the processor 12 as being either fixed information or selectable information. The fixed information is automatically displayed in the fixed display portion 18 and selectable information is stored and made available for display in the selectable display portion 20. FIGS. 3A through 3D show possible arrangements for displaying the selectable information. In FIG. 3C the selectable information is displayed on two separate lines disposed at the bottom portion of the video screen, with the lines being placed one underneath the other. However, it is anticipated that the selectable information can be displayed in other arrangements in accordance with the user's preferences.

The video display device 16 is in communication with the instrument cluster 14 and other processors 12 discussed above and is controllable by an input device 22. The input device 22 is shown in FIG. 1 as a series of buttons 24 disposed beneath the video display device 16. The input device 22 allows the user to control the images seen on the screen through manipulation of the buttons 24. It is anticipated that some images may be automatically controlled and based upon a predetermined condition. For instance, the video screen may automatically flip from displaying a reading of vehicle functions to a camera view of the rear of the vehicle when the vehicle engine is operating and the vehicle is placed in reverse. However, the input device 22 may override any automatic function as to allow the user to control what is displayed. It is also anticipated that other input devices 22 such as a voice recognition system, or a touch screen may be used.

In this embodiment, the series of buttons 24 include a button 24 labeled "Menu," one labeled "Select" and two other buttons 24 labeled with an up and down arrow respectively. The buttons 24 provide the user with a means of interfacing with the video display device 16. Upon pushing the "Menu" button 24, a menu is displayed, as shown in FIG. 4. The menu presents a plurality of options available to the user. The buttons 24 labeled with arrows allow the user to navigate through the available options, and the "Select" button 24 allows the user to choose the command desired. A highlighting feature is provided to inform the user of the option that can be selected by pressing the "Select" button 24. For instance, from the menu the user is able to change the clock, adjust the lighting, or reprogram certain vehicle functions such as a keyless entry code by moving the highlighting feature over the desired option.

Figure 5:
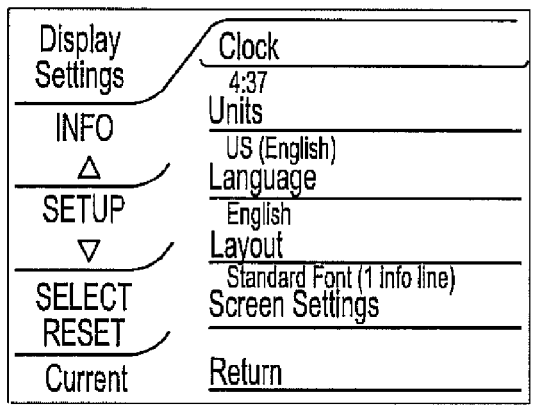
FIG. 5 is a front view of the video display device presenting a sub-menu within the menu, the sub-menu being accessible to the user via input devices disposed beneath the video display device.
Figure 6:
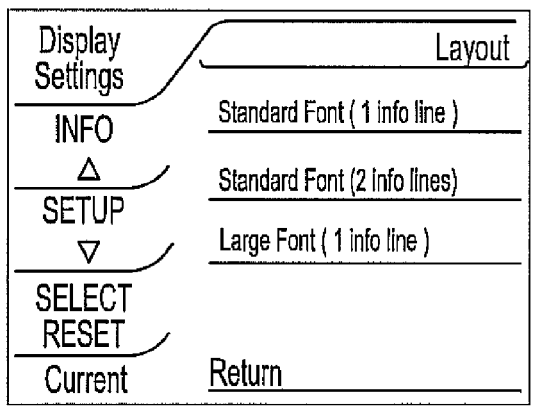
FIG. 6 is a front view of the video display device presenting a sub-menu within the sub-menu presented in FIG. 5, the sub-menu seen in FIG. 6 presents the user with the option of choosing how many lines of information the user wishes to display.

The menu also includes a "Display" option, for which the user may select in order to control the format of the video display device 16, as shown in FIG. 4. Upon selection of the "Display" option, the user is presented with a sub-menu as seen in FIG. 5. The sub-menu provides further options for the user such as options for various units of time, measurement, or the language the text will be displayed in. Specifically the sub-menu includes an option which allows the user to customize the selectable display portion 20 of the video display device 16. When the user manipulates the highlighting feature over the "Layout" option, and presses the "Select" button 24, another sub-menu appears as seen in FIG. 6. In this embodiment, the option is entitled "Layout," but it is anticipated that another title could be used. Pressing the "Layout" option opens another sub-menu that allows the user the option of choosing how many lines of categories of information is to be displayed on the selectable display portion 20 of the video display device 16 as shown in FIG. 6. The layout sub-menu not only provides the user with the option of choosing how many lines of selectable categories of information are to be displayed, but also the font size the selected category of information is to be displayed in.

Figure 7:
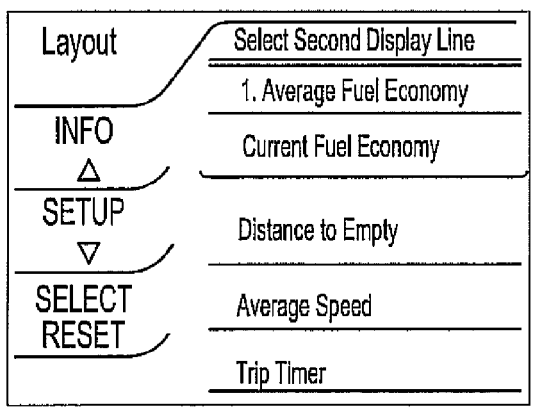
FIG. 7 shows the list of categories of vehicle information from which a user may select from to display on the selectable display portion of the customizable video display system.
Figure 8:
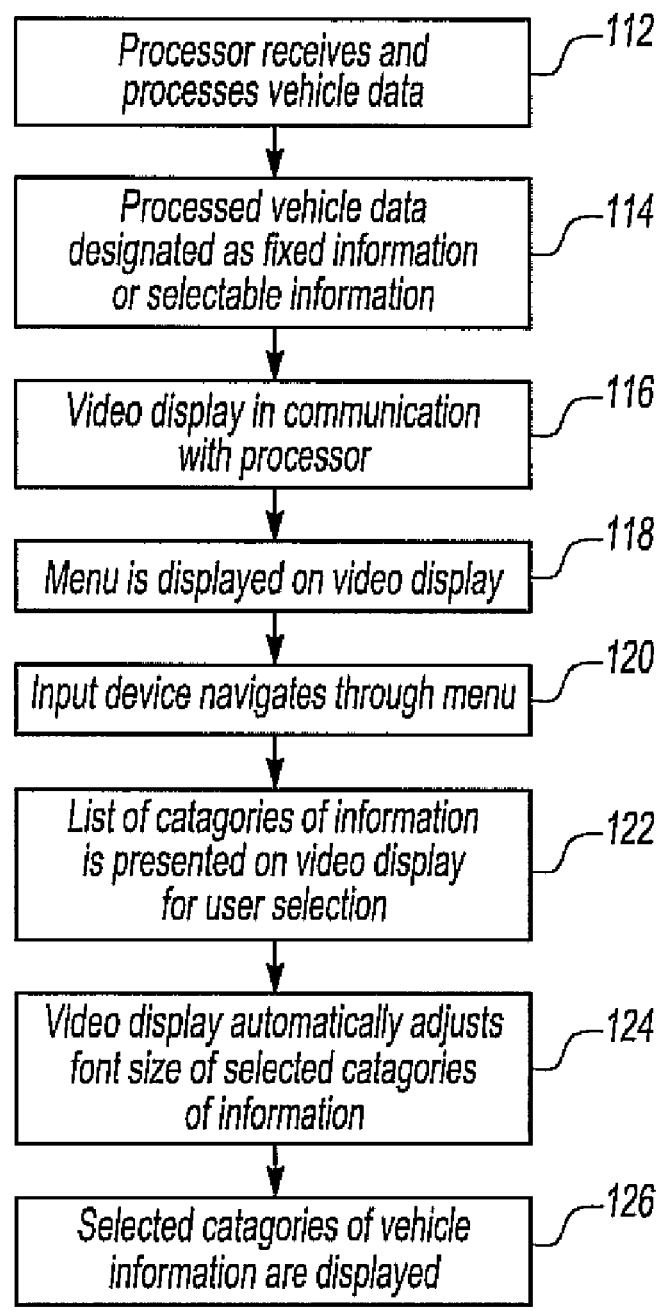
FIG. 8 shows the method by which a user may create a customizable video display system.

Upon choosing how many lines the user wants to display, another sub-menu prompts the user to select from a list of available categories of information available for display upon each line as shown in FIG. 7. In the disclosed embodiment the list of categories of information includes "Average Fuel Economy," Current Fuel Economy," Distance to Empty," and "Trip Timer," but it is anticipated that other categories of information could be added to the list. Accordingly, the system provides for a customizable video display device 16 mounted on the instrument panel of a vehicle for viewing driver information.

The embodiment of the layout menu shown provides the user the choice between displaying one or two lines of information using a default font, or one line of information using a large font. Accordingly, a user may customize an onboard vehicle display to show one or two lines of desired categories of information having a default font, or one line of desired categories of information in a larger font. However, it is anticipated that the layout menu may present more than two lines, with each line capable of displaying different categories of information. It is further anticipated that the font size may be automatically selected depending upon the number of lines of driver information selected such that the font size of one line of information is automatically displayed in a larger font than when two or more lines of information are chosen. Conversely, the font size may automatically change to a size smaller than the default font when the user chooses more than two lines of information. A user desiring to have no information appear may elect to do so by navigating through the menu using the input device 22 until the highlighting feature is over an option which displays no information.

FIG. 6 shows a method for creating a customizable vehicle display presenting a list of categories of information from which the user may choose to display. The embodiment includes providing a vehicle having sensors 10 to monitor and collect vehicle data. A processor 12 is provided at step 112 for receiving and processing vehicle data from various vehicle sensors 10. The processor 12 can be a device currently used in the vehicle, such as an instrument cluster 14. The processor can also designate the processed information as being either fixed information or selectable information at step 114. A video display device 16 is provided at step 116. The video display device 16 is in communication with the processor 12 and can display vehicle data and information to vehicle users. A menu is displayed on the video display device 16 at step 118. The menu has links to sub-menus, the menu and sub-menus being accessible to the user via an input device 22 at step 120. The input device 22 is in communication with both the processor 12 and the video display. The user navigates through the menu via the input device 22 to a list of predetermined categories of vehicle information, and uses the input device 22 to select the categories of vehicle information to be displayed on the video screen at step 122. The font size of the selected categories of vehicle information is adjusted at step 124. The adjustment may be done automatically or by manually by the user. At this point the categories of information are displayed on the video display device 16 in accordance with the selected or default font size at step 126. Thus a method of creating a customizable vehicle display is provided.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A system for providing a customizable display of vehicle and driver information in a vehicle having a plurality of sensors; the plurality of sensors monitoring and collecting signals regarding vehicle functions, the system comprising:
   at least one processor receiving signals from the plurality of sensors and designating the signals as being selectable information or fixed information, the processor further operable to process the signals to generate a list, the list having a plurality of predetermined categories of information;
   a video display device having a predetermined size, the video display device disposed on an instrument panel of the vehicle, the video display device in communication with the processor, the video display device having a fixed display portion and a selectable display portion smaller than the fixed display portion, the fixed display portion automatically adjusting the size of images so as to fit the images within the entire fixed display portion;
   a menu displayed on the selectable display portion of the video display device, the menu presenting the list having the plurality of predetermined categories of vehicle information, the menu further including a selection of a predetermined number of font sizes; and
   an input device operable by a user to select desired categories of vehicle information from the list having the plurality of predetermined categories of vehicle information for viewing on the selectable display portion and the fixed display portion of the video display device, the input device further operable by the user to select one font size from the selection of predetermined number of font sizes for which the selected category of vehicle information is displayed on the selectable display portion of the video display device, the processor automatically adjusting the size of the selected fixed information for display on the fixed display portion, so as to maximize the size of the selected fixed information displayed within the fixed display portion.

2. A system as set forth in claim 1, wherein the input device being a plurality of buttons operable to actuate the menu and select at least one predetermined category of information from the list of the predetermined categories of information.

3. A system as set forth in claim 1, wherein the input device is voice activated and operable to actuate the menu and select predetermined categories of information by verbal commands.

4. A method for providing a customizable video display device for viewing driver information in a vehicle having a plurality of sensors monitoring and collecting predetermined categories of vehicle information, the method comprising:
   providing a processor for receiving and processing the predetermined categories of vehicle information, the processor being in communication with the customizable video display device;
   providing a customizable video display device with a fixed display portion and a selectable display portion, the fixed display portion being larger than the selectable display portion;
   displaying a menu on the selectable display portion of the customizable video display device, the menu presenting a list of the predetermined categories of information and a selection of font sizes;
   providing an input device operable to select one of the predetermined categories of information from the list of predetermined categories of information and to select one of the font sizes from the selection of font sizes;
   selecting one of the predetermined categories of information from the list having the predetermined categories of information;
   selecting one of the font sizes from the selection of font sizes; and displaying the selected predetermined categories of information in the font size selected by the operator on selectable display portion of the customizable video display device.

5. A method as set forth in claim 4, wherein the processor is further operable to designate the predetermined categories of vehicle information as being a fixed information or a selectable information, the customizable video display device automatically displaying the fixed information for viewing on the fixed display portion of the customizable video display device.

* * * * *